United States Patent
Remple et al.

(10) Patent No.: US 11,308,023 B2
(45) Date of Patent: Apr. 19, 2022

(54) METHOD AND SYSTEM FOR ENHANCED SPI COMMUNICATION

(71) Applicant: Microchip Technology Incorporated, Chandler, AZ (US)

(72) Inventors: Jason Remple, San Diego, CA (US); Andrea Panigada, San Diego, CA (US); Bogdan Bolocan, Eggenstein-Leopoldshafen (DE)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/109,315

(22) Filed: Dec. 2, 2020

(65) Prior Publication Data

US 2021/0303503 A1    Sep. 30, 2021

Related U.S. Application Data

(60) Provisional application No. 62/993,959, filed on Mar. 24, 2020.

(51) Int. Cl.
  *G06F 13/42*   (2006.01)
  *G06F 9/30*    (2018.01)
  *G06F 13/374*  (2006.01)
  *G06F 13/362*  (2006.01)

(52) U.S. Cl.
  CPC ...... *G06F 13/4291* (2013.01); *G06F 9/30101* (2013.01); *G06F 13/362* (2013.01); *G06F 13/374* (2013.01)

(58) Field of Classification Search
  CPC .. G06F 13/362; G06F 13/374; G06F 13/4291; G06F 13/4282; G06F 13/4247
  See application file for complete search history.

(56) References Cited

U.S. PATENT DOCUMENTS

| | | | | |
|---|---|---|---|---|
| 5,878,234 | A | 3/1999 | Dutkiewicz et al. | ......... 710/110 |
| 8,086,761 | B2 * | 12/2011 | Huang | ............... G06F 13/4291 |
| | | | | 710/10 |
| 8,732,366 | B2 * | 5/2014 | Fugate | ............... G06F 13/4081 |
| | | | | 710/104 |
| 8,909,841 | B2 * | 12/2014 | Engl | .................. G06F 13/4072 |
| | | | | 710/305 |
| 9,217,653 | B2 * | 12/2015 | Kleven | ................. G01D 21/00 |
| 10,055,376 | B1 * | 8/2018 | Newkirk | ............ G06F 13/4291 |

(Continued)

FOREIGN PATENT DOCUMENTS

| CN | 110471881 A | 11/2019 | ............. G06F 13/14 |
|---|---|---|---|
| JP | 63250759 A | 10/1988 | ............. G06F 13/38 |

OTHER PUBLICATIONS

Motorola, Inc., "SPI Block Guide V04.01," URL: https://www.nxp.com/files-static/microcontrollers/doc/ref_manual/S12SPIV4.pdf, 40 pages, Jul. 14, 2004.

(Continued)

*Primary Examiner* — Brian T Misiura

(74) *Attorney, Agent, or Firm* — Slayden Grubert Beard PLLC

(57) ABSTRACT

A slave device includes an SPI bus with a mode detection circuit configured to detect an SPI operating mode that has been applied by a master device. The slave device is configurable to operate in a first or a second mode depending on the detection of the SPI operating mode as applied by the master device.

21 Claims, 8 Drawing Sheets

(56) References Cited

U.S. PATENT DOCUMENTS

2009/0019328 A1\* 1/2009 Van De Logt .............................. G01R 31/318572
                                                                          714/727
2021/0064563 A1\* 3/2021 Quiquempoix ..... G06F 13/4068
2021/0064564 A1\* 3/2021 Quiquempoix ..... G06F 13/4247

OTHER PUBLICATIONS

International Search Report and Written Opinion, Application No. PCT/US2021/016135, 15 pages, dated May 26, 2021.

\* cited by examiner

METHOD AND SYSTEM FOR ENHANCED SPI COMMUNICATION

RELATED APPLICATIONS

This application claims priority to commonly owned U.S. Provisional Patent Application No. 62/993,959 filed Mar. 24, 2020, the entire contents of which are hereby incorporated by reference for all purposes.

TECHNICAL FIELD

The present disclosure relates to serial communication protocols, in particular, by multiplexing different data streams using multiple modes over the synchronous serial peripheral interface (SPI).

BACKGROUND

Conventional serial interfaces transmit data in serial fashion over one or more data lines. The SPI interface is a serial interface that uses separate data and clock lines. Transmission is unidirectional, therefore, separate transmit and receive data lines are provided. The SPI interface is a very common interface used in microcontrollers to communicate with external devices. Thus, these interfaces may also be used in a plurality of stand-alone devices, such as analog-to-digital converters (ADCs), digital-to-analog converters (DACs), sensor devices, transmitters and receivers and any other type of device that needs to communicate with a microprocessor, microcontroller, or FPGA.

Many devices, such as ADCs (e.g. SAR ADCs) have very simple 4-Wire SPI interface with a chip select line (CS), a clock line (SCK), a data in line (SDI), and a data out line (SDO). As more and more features, such as digital postprocessing of converted data, are added within ADC device, a proper R/W register interface is required, to allow the user to program the part, or enable/disable features, etc. Other peripheral devices may have similar requirements.

SUMMARY

Hence, there exists a need for an improved, low-overhead, multiple data-stream that provides such functionality on top of SPI.

According to certain embodiments, a slave device comprises a serial peripheral interface (SPI) module with a mode detection circuit configured to detect an SPI operating mode that has been applied by a master device, wherein the slave device is configurable to operate in a first or a second mode depending on the detection of the SPI operating mode as applied by the master device.

According to a further embodiment, the mode detection circuit may comprise an edge and signal detection circuit receiving a chip select signal and a clock signal from the master device. According to a further embodiment, the edge and signal detection circuit may evaluate the state of the clock signal when the chip select signal transitions from an asserted state to an idle state. According to a further embodiment, a first mode can be a functional mode, wherein receiving signals from the master device indicating the first mode control a primary function of the peripheral slave device. According to a further embodiment, the peripheral slave device can be an analog-to-digital converter and the first mode is a conversion mode. According to a further embodiment, selecting a first SPI operating mode by the master device may trigger a start of at least one conversion of the analog-to-digital converter. According to a further embodiment, a second mode can be a command mode that allows configuration of the slave device and access to registers of the slave device. According to a further embodiment, after identifying the second mode by the slave device, the slave device can be configured to expect a command on a data in signal line. According to a further embodiment, the slave device can be further configurable to operate in a Single mode or a Daisy-Chain mode, wherein a mode switch is performed through a dedicated command. According to a further embodiment, a received command can be evaluated by the slave device as soon as a last bit of the command is received when in Single mode and wherein in Daisy-Chain mode a received command is evaluated by the slave device only after de-assertion of a chip select signal. According to a further embodiment, the slave device can be further configurable to operate in a third mode through a logic state on a data output line of the master device, wherein the third mode is a command mode in a Daisy-Chain mode.

According to another embodiment, a system comprises a master device and a plurality of slave devices coupled in daisy-chain topology with a serial peripheral interface (SPI) module of the master device, wherein each slave device comprises an SPI module and further comprises a mode detection circuit configured to detect an SPI operating mode that has been applied by the master device, wherein each slave device is configurable to operate in a first or a second mode depending on the detection of the SPI operating mode as applied by the master device through a clock signal and a chip select signal.

According to a further embodiment of the above system, a first mode can be a functional mode wherein a primary function of the slave device is performed and wherein a second mode is a command mode that allows configuration of the slave device and access to registers of the slave device. According to a further embodiment of the above system, a dedicated command received by a slave device in command mode may cause the device to enter a Daisy-Chain mode. According to a further embodiment of the above system, when in Daisy-Chain mode, each slave device only evaluates a received command if the master de-asserts the chip select signal while remaining in command mode.

According to yet another embodiment, a method of operating a slave device coupled with a master device through a serial peripheral interface (SPI) module may comprise: detecting an SPI operating mode by the slave device that has been applied by a master device, wherein the slave device is configurable to operate in a first or a second mode; and operating the slave device in the first or second mode depending on the detection of the SPI operating mode as applied by the master device.

According to a further embodiment of the above method, the method may further comprise receiving and analyzing a chip select signal and a clock signal from the master device to determine whether said first or second mode has been applied, wherein the state of the clock signal is evaluated when the chip select signal transitions from an asserted state to an idle state. According to a further embodiment of the above method, a first mode can be a functional mode wherein a primary function of the slave device is performed and wherein a second mode is a command mode that allows configuration of the slave device and access to registers of the slave device. According to a further embodiment of the above method, the method may further comprise configuring the slave device to operate in a Single mode or a Daisy-Chain mode, wherein a mode switch is performed through a dedicated command received during a command mode.

According to yet another embodiment, a method for operating a system comprising a master device and a plurality of slave devices coupled in daisy-chain topology with a serial peripheral interface (SPI) module of the master device, wherein each slave device comprises an SPI module and further comprises a mode detection circuit configured to detect an SPI operating mode that has been applied by the master device, may comprise: sending signals through the SPI module by the master device that indicate a selected SPI operating mode; and receiving in Daisy-Chain fashion by each slave device said signals and determining by each slave device to operate in a first or a second mode depending on the detection of the SPI operating mode as applied by the master device.

According to a further embodiment of the above method, a dedicated command received by a slave device in command mode may cause the device to enter a Daisy-Chain mode. According to a further embodiment of the above method, when in Daisy-Chain mode, each slave device only evaluates a received command if the master de-asserts a chip select signal while remaining in command mode.

DETAILED DESCRIPTION

Figure 1:
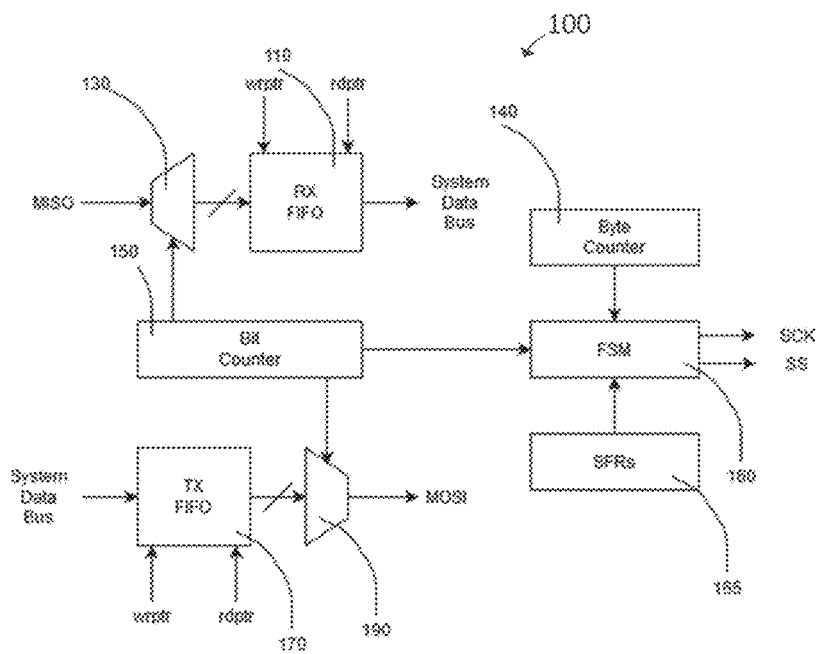
FIG. 1 shows a conventional SPI bus circuit.

According to an embodiment, a multiplexing mechanism can be provided that allows a slave, for example, an analog-to-digital converter (ADC), to (i) send conversion data to the master and to (ii) grant access to Read/Write (R/W) registers using the same hardware interface, composed of a chip select (CS) signal line, a serial data input (SDI) signal line, a serial data output (SDO) signal line, and a serial clock (SCK) signal line.

According to various embodiments, the protocol is designed to repurpose the function of the prior art SPI 4 pins allowing different types of communication to occur through the same hardware interface. This can be beneficially used in the next generation of SAR ADCs and other peripheral devices. The various embodiments can be used in any slave device that needs to communicate data serially to a master as well as to provide access to R/W registers. According to various embodiments, this protocol is compatible with many existing microcontrollers.

An advanced ADC may support, for example, 2 operating modes; a conversion data mode and a command data mode. In addition, an advanced ADC may support 2 topologies, a single device topology and a daisy chain topology with a plurality of devices coupled through the SPI bus in a serial link.

According to various embodiments, all the above operating modes may be supported in a way that is compatible with the existing SPI controllers in many existing microcontrollers. Thus, a method can be provided that allows to select command data mode vs. conversion data mode, to enter a daisy chain mode, and to be able to individually address devices in a daisy chain. According to various embodiments a communication protocol is provided that enables new capabilities within a peripheral device, such as an ADC without requiring a second dedicated serial interface. For example, additional functional elements such as FIFO/LIFO, filters, and/or user programmable features, etc. can be implemented and controlled through the same interface. Furthermore, a daisy chain operating mode can be enabled for ADCs or other peripherals. The present protocol is "MCU friendly", i.e. it facilitates the communication between a slave, such as, for example an ADC and many families of microcontrollers as masters, in particular microcontrollers manufactured by the assignee of this application. Without the "MCU friendly" proposed features, any microcontroller would have to add additional information when exchanging data over SPI bus in order to support the data-stream multiplexing associated with different slave chip operating modes. The present protocol allows to offload the microcontroller by removing the need for in-band signaling necessary for data-stream multiplexing. Thus, the microcontroller can, for example, stay in a low-power mode until the ADC has all the data prepared for it. In this way, the present protocol reduces the overall system's power consumption.

The present protocol furthermore can reduce latency. In a conventional ADC, instead of having command and conversion modes, conversion data is read as data from a read/only register. In this case, data is retrieved by issuing a read instruction to a pre-determined register address. This is inefficient, because for each data sample, for example a 16-bit conversion data, first a 16-bit read instruction is issued, thus doubling the latency and the power consumption. In this example, a 32 bit communication data is therefore necessary to retrieve a 16 bit conversion data, which is undesirable.

FIG. 1 shows a block diagram of a typical synchronous SPI device 100 of a master device. A first de-serializer 130 receives a serial MISO (Master Input Slave Output) signal and forwards a parallel 8-bit signal to an N-deep receive FIFO 110. FIG. 1 also shows read and write pointers signals rdptr, wrptr, respectively, fed to the FIFO 110, to control it. De-serializer 130 is also controlled by bit counter 150 which also controls finite state machine 160 which outputs clock signal SCK and if implemented may also output a slave select signal SS. Finite state machine 160 is further coupled with a byte counter 140. On a transmitter side, an N-deep transmit FIFO 170 outputs an 8-bit parallel signal to a serializer 190 whose output provides the MOSI (Master Output Slave Input) signal. The transmit FIFO 170 can be similar to receive FIFO 110 and may be coupled with the system bus. Again, read and write pointer signals rdptr, wrptr, respectively, will be used to control the transmit FIFO 170. Special functions registers 165 control the finite state machine 160, to operate SPI device 100 in various operating modes. The actual implementation of the SPI device for a master device is not critical as long as it allows the SPI device to operate in different operating modes which is common in most microcontrollers. FIG. 1 is just one example of a master SPI device that uses FIFOs. Other implementations may be possible.

Figure 2:
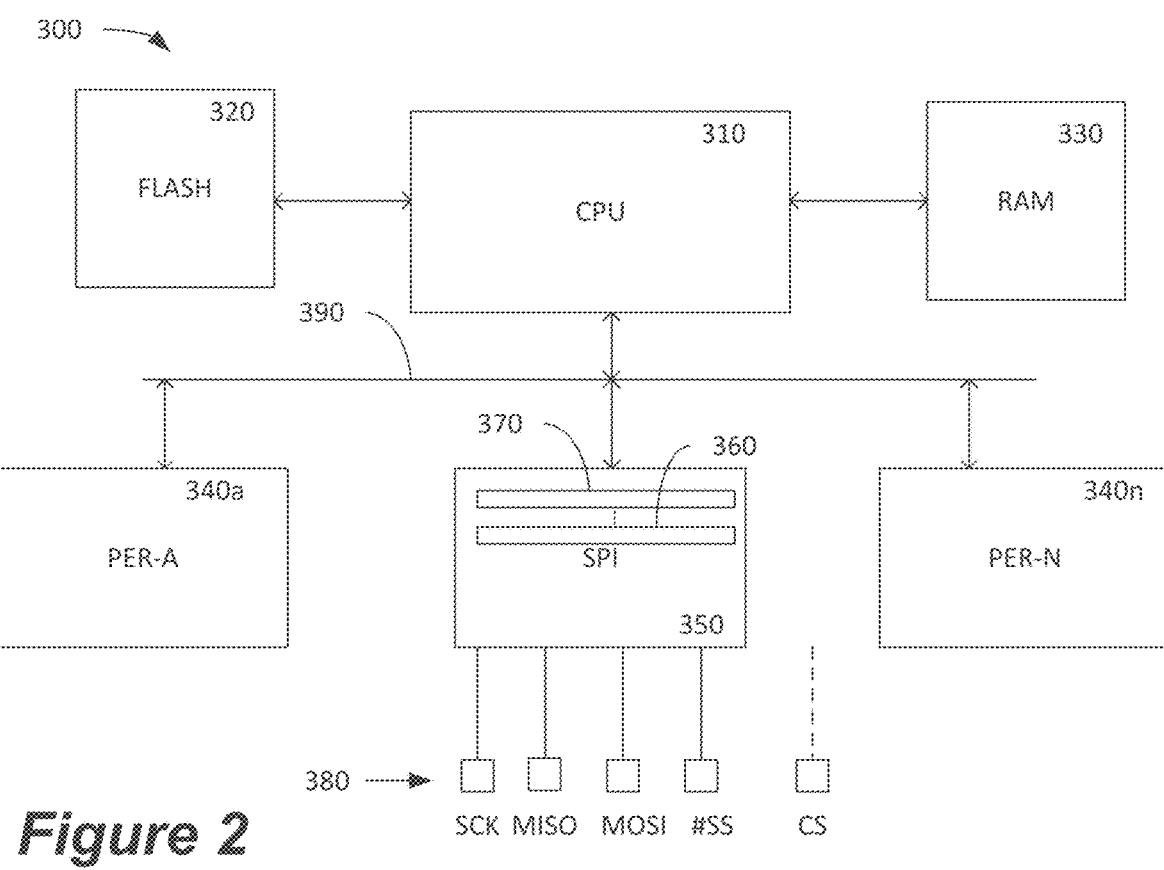
FIG. 2 shows a microcontroller comprising an SPI bus.

FIG. 2 shows an example of an integration of a SPI peripheral within a master device, for example, in a single chip microcontroller 300. The microcontroller 300 comprises a central processing unit 310 coupled with a program flash memory 320 and a data random access memory 330 implementing a Harvard architecture. However, other architectures and memories may be used according to other embodiments. An internal system bus 390 couples the CPU 310 with a plurality of peripheral devices 340*a* . . . *n*, and with an SPI peripheral 350. SPI peripheral 350 may have a plurality of configuration registers 360, 370 corresponding to registers 165 of FIG. 1 that are special function registers of the microcontroller 300 and may be memory mapped to the program flash memory 230. The microcontroller 300 may have a plurality of external pins that in a default setting operate as digital or analog I/O ports 380. Some of these pins 380 may be configurable to be assigned to the SPI module 350 as shown in FIG. 2. For example, one pin CLK may be assigned to transmit or receive a clock signal, one pin MISO may be used as a serial data input pin, one pin MOSI may be used as a serial data output pin, and one pin #SS may be used as slave select or frame synchronization pin. When activating the SPI peripheral 350, a minimum of pins CLK and MISO or MOSI may be used. In addition, a CS pin may be used, in particular if more than one slave unit communicates over the same bus. Generally, a plurality of such pins may be required for a master device such as microcontroller 300 depending on the application and therefore these pins are simply I/O port pins and will be set by software. However, some embodiments of an SPI module 350 may automatically control one or more such pins.

Figure 3A:
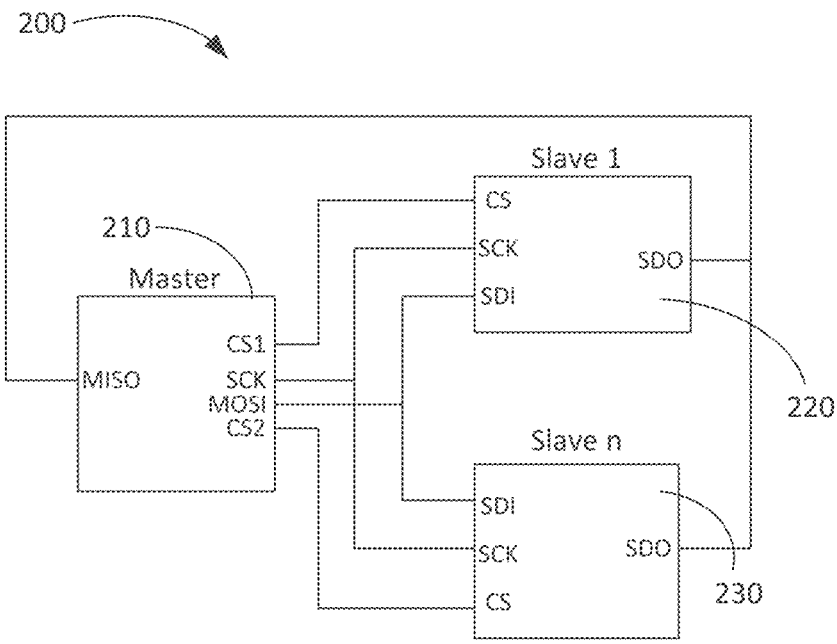
FIG. 3a shows a system with one master device and two individually accessible slave devices.

SPIs allow the transfer of data serially between multiple devices. FIG. 3*a* shows a typical arrangement 200 with a master device 210 and a plurality of slave devices 220, 230, denoted respectively Slave 1, Slave n. The serial output data is changed on a particular SCK edge depending on the operating mode and the data is sampled on the next SCK edge through the MISO and MOSI pins, as will be explained in more detail below. Conventional SPI systems transfer data word-wise, where the word size=data bus width, for example, an 8 bit MCU generally transfer 8 bit SPI bytes. More advanced microcontrollers, such as 16-bit or 32-bit microcontrollers may also allow transfer of 16 bit, 24 bit or 32 bit words. In arrangement 200, the data and clock signals are each coupled in parallel with each slave device 220, 230. To only transfer data to a single device, separate chip select signals CS1, CS2 are provided, each connected to a respective one of slave devices 220, 230. These signals may be generated automatically by the SPI module in the microcontroller or must be controlled by software through a general purpose I/O port. The chip select signals are generally enabled when in a low state and de-asserted when in a high state.

Figure 3B:
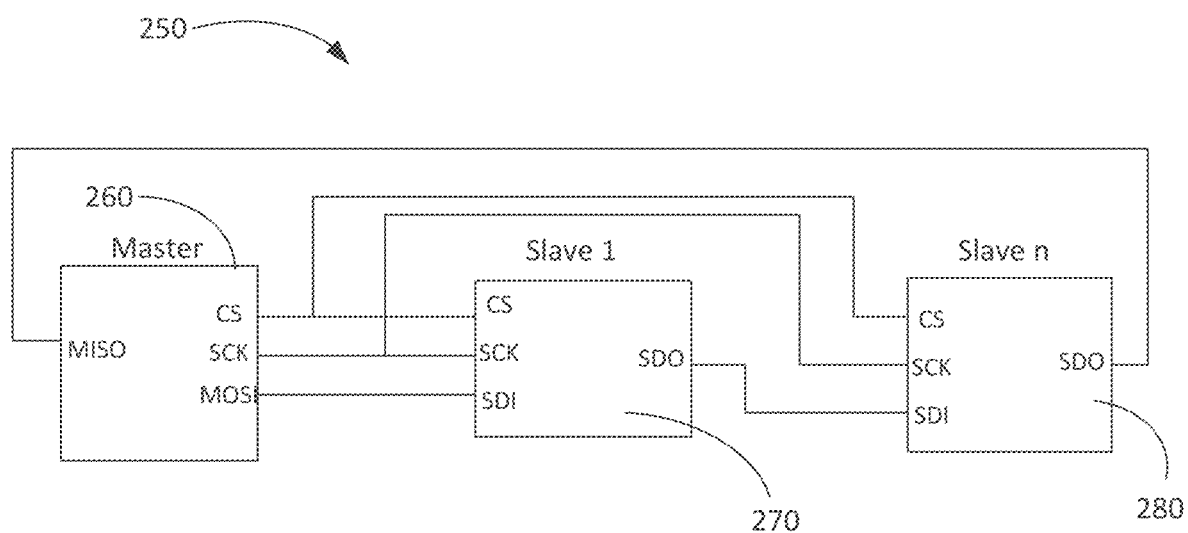
FIG. 3b shows a system with one master device and two slave devices in a daisy chain topology.

FIG. 3*b* shows another topology that uses a daisy-chain mechanism. Here, a master device 260 is connected with multiple slaves 270, 280, denoted respectively Slave 1 and Slave n, in serial fashion. The clock signal and a single chip select signal CS are connected in parallel with all slave devices 270, 280. However, the data output signal MOSI is only connected with the data input SDI of the Slave 1 270. The data output SDO of the Slave 1 270 is connected with the data input SDI of the next slave device 280. Multiple slave devices can be coupled in series in this way. The data out SDO of the Slave n 280, i.e. the last slave device in the daisy chain, is connected to the data input MISO of the master device 260. For a better overview, FIG. 3*b* only shows two slave devices 270, 280 in a daisy-chain topology. However, any number of slave devices may be connected in this way. This arrangement has the benefit of only requiring a single chip select signal whereas the topology of FIG. 3*a* requires one chip select signal per slave device.

The arrangement in FIG. 2 acting as an SPI master device may be configurable to operate the SPI bus in various SPI modes. For example, SPI mode (0,0) or SPI mode 0 uses a clock signal with an idle state of logic 0 and the data signal is clocked out by the master device with a falling edge of the clock signal and clocked in with a rising edge of the clock signal. The slave must operate correspondingly. For SPI mode (0, 1), the clock signal is defined the same as before and the data signal is now clocked out by the master with a rising edge of the clock signal and clocked in with a falling edge of the clock signal. SPI mode (1,0) defines the clock signal to be idle at logic 1 and the evaluation of the data signal is performed as in SPI mode (0, 0). SPI mode (1, 1) defines the clock signal as in SPI mode (1,0) and the data evaluation as in SPI mode (0,1).

According to various embodiments, a slave device comprising an SPI bus, for example, a SAR ADC device, can be designed to detect the SPI operating mode from the master at each rising edge of the chip select signal CS. If SPI mode (0,1) is detected, the SAR ADC enters "Conversion Mode". In this case a rising edge of the chip select signal CS will trigger an A/D conversion. At the following falling edge of chip select signal CS, the data out signal line SDO will output converted data.

If SPI mode (1,1) is detected, the SAR ADC enters "Command Mode" and a rising edge of the chip select signal CS will not trigger an A/D conversion. At the following falling edge of the chip select signal CS, an instruction on the data in signal line SDI is expected.

From the master perspective (e.g. MCU) the idea is to use SPI mode (0,1) to launch conversions and collect conversion data and SPI mode (1,1) to read/write registers or send fast commands. Most conventional microcontrollers allow the switching of SPI operating modes. In conventional applications, a mode is generally set once for communicating with a peripheral, i.e. a slave device. However, if slave devices requiring different SPI operating modes are coupled to the same SPI bus, software may switch modes of the master device to the respective mode required by each slave device.

Figure 4:
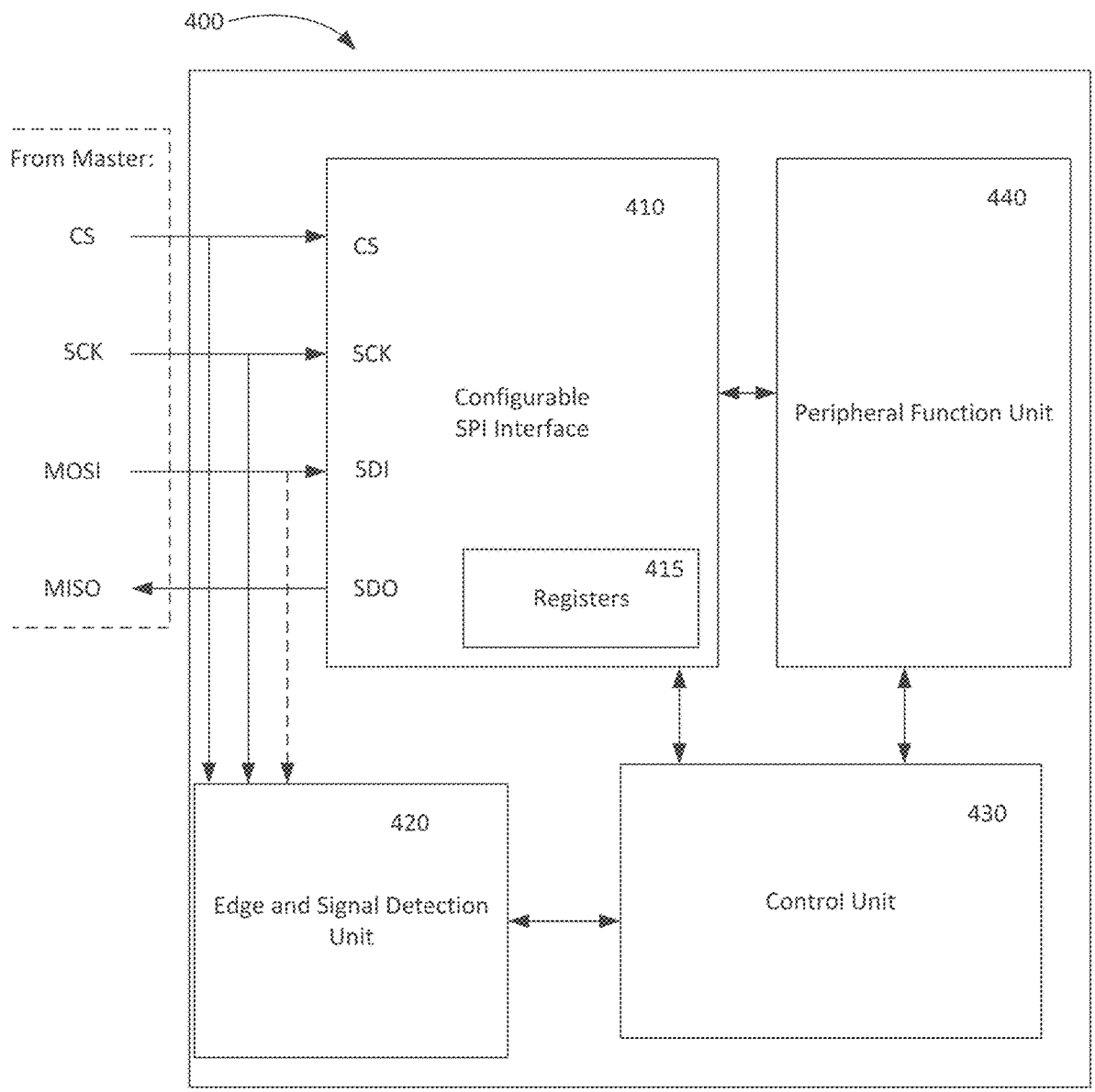
FIG. 4 shows an embodiment of a slave device SPI bus.

FIG. 4 shows an example block diagram of a slave device 400. The slave device 400 comprises a configurable SPI interface 410 which is configurable through a control unit 430 to operate in various SPI operating modes. The configurable SPI interface 410 may comprise configuration registers 415. However, such configuration registers 415 may be located anywhere else within the slave device 400. The configurable SPI interface 410 receives the chip select signal CS, the clock signal SCK and the data out signal MOSI from a master and transmits its own SDO signal to the MISO input of the master on respective signal lines. A mode detection circuit in the form of an edge and signal detection unit 420 is provided that provides analysis of the incoming signals CS, SCK and optionally also the date out signal MOSI as indicated by the dotted line from the master, and is arranged to report its analysis to the control unit 430. One or more logic signals may be used to communicate the respective analysis. Edge and signal detection unit 420 may generate the logic signals to communicate the respective analysis on its own or under control of the control unit 430. The control unit 430 may reconfigure the configurable SPI interface 410 of the slave device 400 and also control the actual peripheral function performed by a peripheral function unit 440 to operate in different modes, such as, a first and a second mode as will be explained in more detail below. Peripheral function unit 440 may also directly provide or receive data to or from the configurable SPI interface 410 or provide/receive any data through control unit 430 depending on the design of the slave device 400.

To be compatible with existing microcontrollers, only the chip select signal CS and the clock signal SCK need to be evaluated by a mode detection circuit as they distinguish between two modes, such as mode (0,0) and mode (1,0) or between mode (0,1) and mode (1,1). Other signals, such as the MOSI signal could also be evaluated, in particular, if more operating modes of the slave device are desired. However, the MOSI signal may not be easily controllable in most microcontrollers and would need additional software control on the microcontroller side.

Thus, a mode detection circuit is formed by an edge and signal detection unit 420 which only needs to evaluate the chip select signal CS and the clock signal CLK to switch between two operating modes. In case the MOSI signal of the master device could be independently controlled, four operating modes could be detectable by setting the MOSI into logic high or logic low before a chip select signal is asserted.

Figure 5:
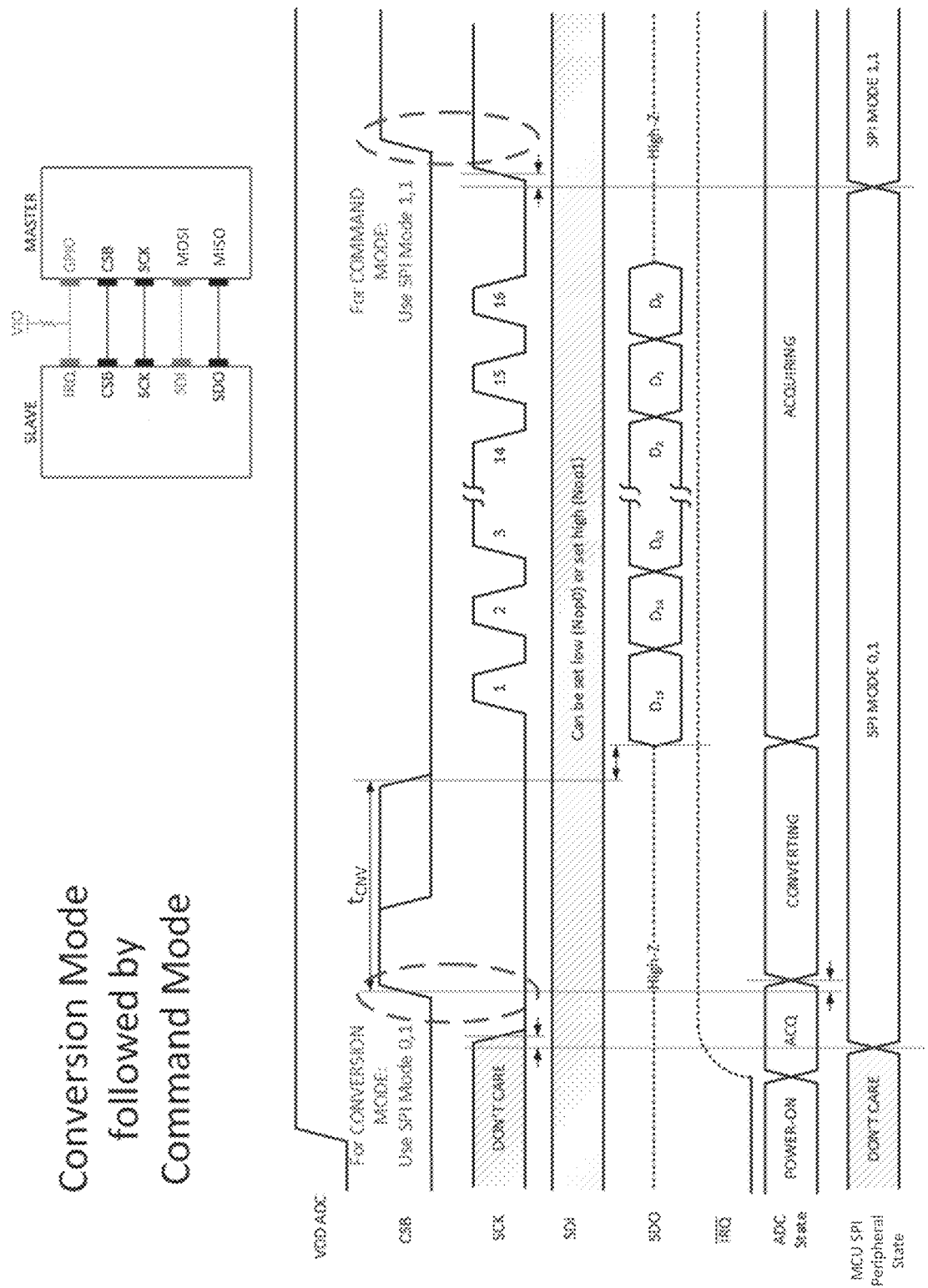
FIGS. 5-8 show various timing diagrams.

FIG. 5 shows a timing diagram of signals between a master device and a slave device connected as shown on top of FIG. 5. The timing diagram shows for the slave device, from top to bottom, the supply voltage signal VDD ADC, the chip select signal CSB, the clock signal SCK, the data in signal SDI, the data out signal SDO, an interrupt request signal IRQ (not used in this example). Furthermore, FIG. 5 shows the ADC slave device state as ADC State and the master device state as MCU SPI Controller State.

The example shown in FIG. 5 shows how a first operating mode, for example a functional mode, is detected by the mode detection circuit of the slave device, such as, a conversion mode in an ADC or a DAC, or any other peripheral device with a controlled and configurable function. A functional mode is to be understood as a mode controlling a primary purpose or function of the slave device. A command mode is considered as a configuration mode of the respective slave device that also may allow access to all its registers. In this example, SPI operating mode 0,1 is chosen to trigger the conversion mode and operating mode 1,1 is chosen to trigger the command mode. The edge and signal detection unit 420 therefore monitors the chip select signal CSB and the clock signal SCK. Before power on, as shown in FIG. 5, CSB is low. After power on, the chip select signal will be low and the clock signal SCK will be in an indeterminate state. According to various operating modes, the idle state of the clock signal SCK is either high or low. With the de-assertion of the chip select signal, i.e. setting it to a high value, the edge and signal detection unit will determine that SPI mode (0, 1) has been selected by the master because the clock signal is low when the chip select signal turned high. Thus, this detection will be communicated to control unit 430 which can then configure the SPI interface 410 accordingly and switch the peripheral device into conversion mode. In conversion mode, the slave device can for example, start an analog to digital conversion independently and convert data continuously as shown in FIG. 5 wherein converted data is clocked out upon assertion of the chip select line, i.e. upon setting CS to a low logic level, and with the received clock signal. To this end, the master must wait a predefined conversion time ($t_{CNV}$) as shown in FIG. 5. A new conversion may be started, for example (see FIG. 6), when clock signal SCK=0 and the chip select signal CSB goes from 0 to 1. Alternatively, a new conversion may be started as soon as the data is transferred or a transfer requested.

Once the chip select signal CSB is pulled high and therefore de-asserted, the edge and signal detection unit may monitor the SCK signal again to determine the operating mode. As shown in FIG. 5, just before the second rising edge of the chip select signal CSB, the master changed the SPI operating mode to SPI mode 1,1 in which the idle state of the SCK signal is a logic high. Again, the edge and signal detection unit 420 communicates this state to the control unit 430 of the slave device which then configures itself to operate in a second operating mode, for example, the command mode in which the device can be further configured by the master and/or registers of the slave can be read by the master. For, example, the master may now have easy access to the configuration and/or special function registers of the slave device.

Figure 6:
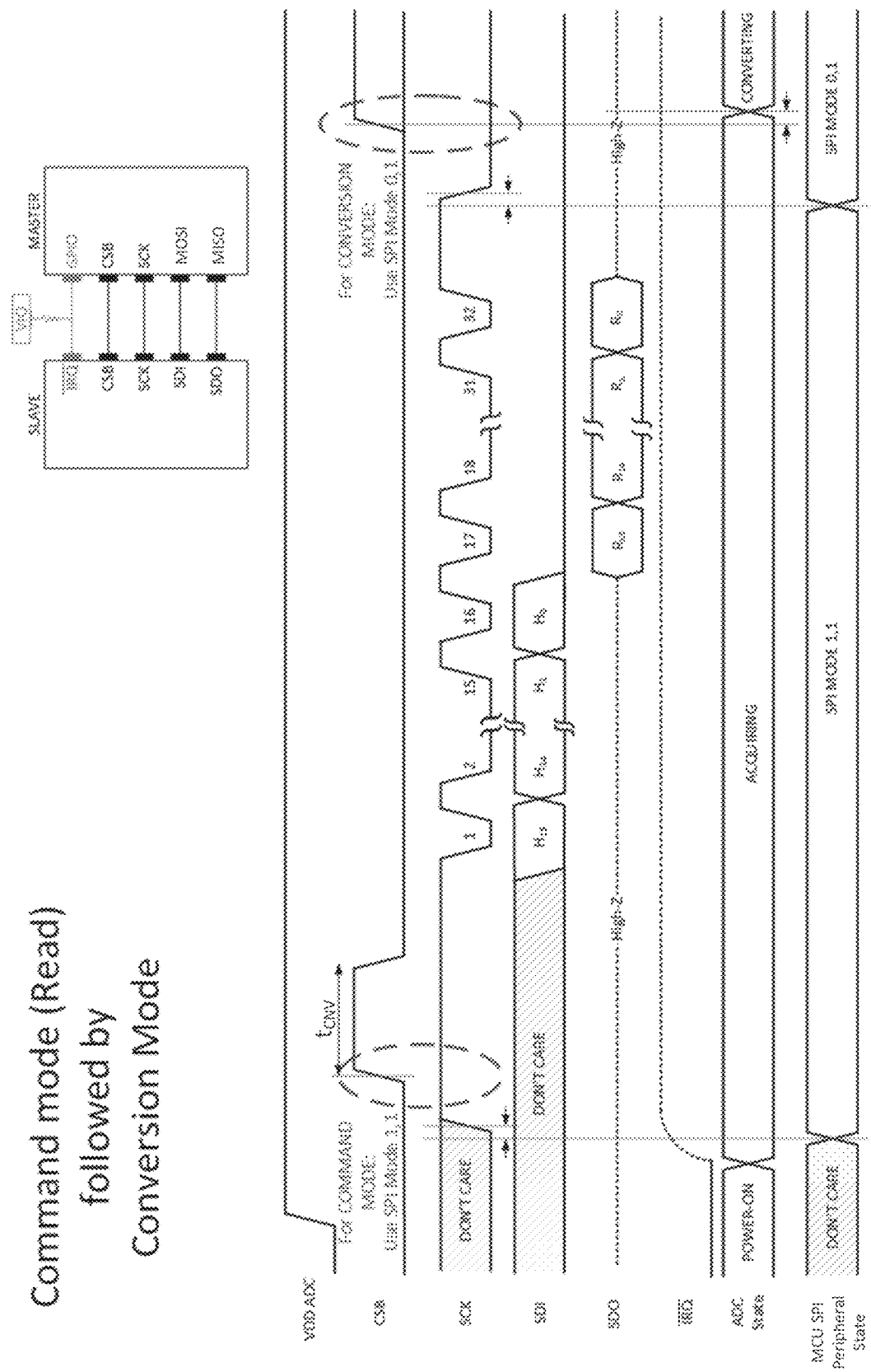

FIG. 6 shows another timing diagram of the command mode in which the master requests certain data from the slave similar to the signals shown in FIG. 5. For example, the master may transfer a read command to the slave devices SDI input that may include, for example an address pointing to a specific register within the slave device. As shown in FIG. 6, after receiving the command that may, for example, be 16 bits long (represented by H15-H0), the slave device transfers the requested data on to the master through its SDO data line (represented by R15-R0). As further shown in FIG. 6, the slave device is switched back into conversion mode (when clock signal SCK=0 and the chip select signal CSB goes from 0 to 1, thus switching to SPI Mode (0,1)) after the transfer has been completed and the chip select signal has been de-asserted again.

Figure 7:
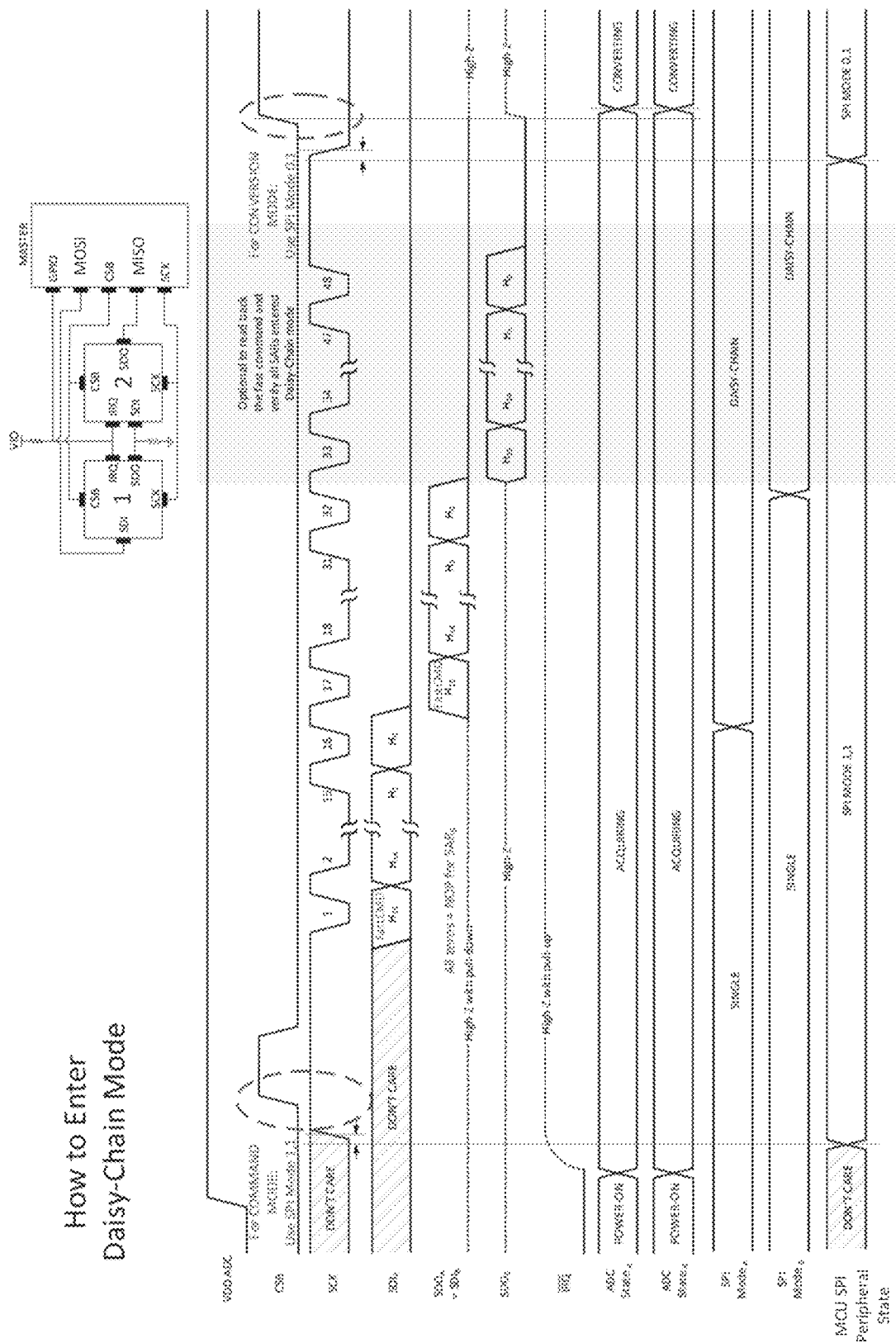

FIG. 7 shows operation of a master and two slaves coupled in daisy-chain fashion with the master. The timing diagram shows for the slave devices from top to bottom, the supply voltage signal VDD ADC as applied to all slave devices, the chip select signal CSB, the clock signal SCK, the data in signal SDI of the first slave device, the data out signal SDO of the first slave device which is equal to the data in signal of the next slave device, the data out signal of the second slave device as received by the SDI input of the master device, and an interrupt request signal IRQ (not used in this example). Furthermore, FIG. 7 shows the ADC slave device states as ADC State$_A$ and ADC State$_B$, the SPI modes of the slaves as SPI mode$_A$ and SPI mode$_B$, and the master device state as MCU SPI Controller State.

First, the master applies SPI mode (1,1) which switches the slave devices into command mode. A "FAST command" is then transferred by the master and clocked into the first slave device with the first 16 clock pulses. According to various embodiments, a FAST command is defined as an instruction that does not require further data to be completed. For example, in some embodiments, a 16-bit instruction that causes a reset event for the device is considered a FAST command. Thus, a WRITE command, instead, may not be considered a fast command, because it needs further data to be completed: for example a WRITE command can be a 16-bit instruction that (i) selects the write mode and (ii) selects a specific address to be written to. This is followed by further data, which are the values to be written at the specified address. Similarly, a READ command is not considered a fast command, because it requires the slave to respond with data which are the values read from the address specified by the 16-bit READ instruction. When the slave device is not in daisy-chain mode, according to various embodiments, FAST commands are evaluated immediately after the last bit of the instruction is received. Among FAST commands, in some embodiments, 3 commands can be defined: All 16-bit zeros and all 16-bit ones are defined as No Operation (=NOP) FAST commands: when a NOP command is received, the slave device will not do anything and be ready for a new command. According to some embodiments, any specific sequence of 16 ones and zeros except the NOP commands can be defined as the FAST command to enter DAISY-CHAIN mode.

One embodiment of a FAST command is a dedicated command that causes the first slave device to enter DAISY-CHAIN mode. In the meanwhile the second slave device received a NOP from the first slave device which transmits a NOP after start-up until further commands are received. The master then applies another 16 clock pulses which route the "FAST command" to the next slave device in the daisy chain, causing the next slave device to enter DAISY-CHAN mode. If further devices are present in the daisy chain, more sets of 16 clock pulses are transferred to the slave devices until all devices in the daisy chain received the respective command. After de-asserting the chip select signal, i.e. setting it to a high value, the master will again switch into SPI mode 0,1 which then triggers the conversion mode in all devices.

Figure 8:
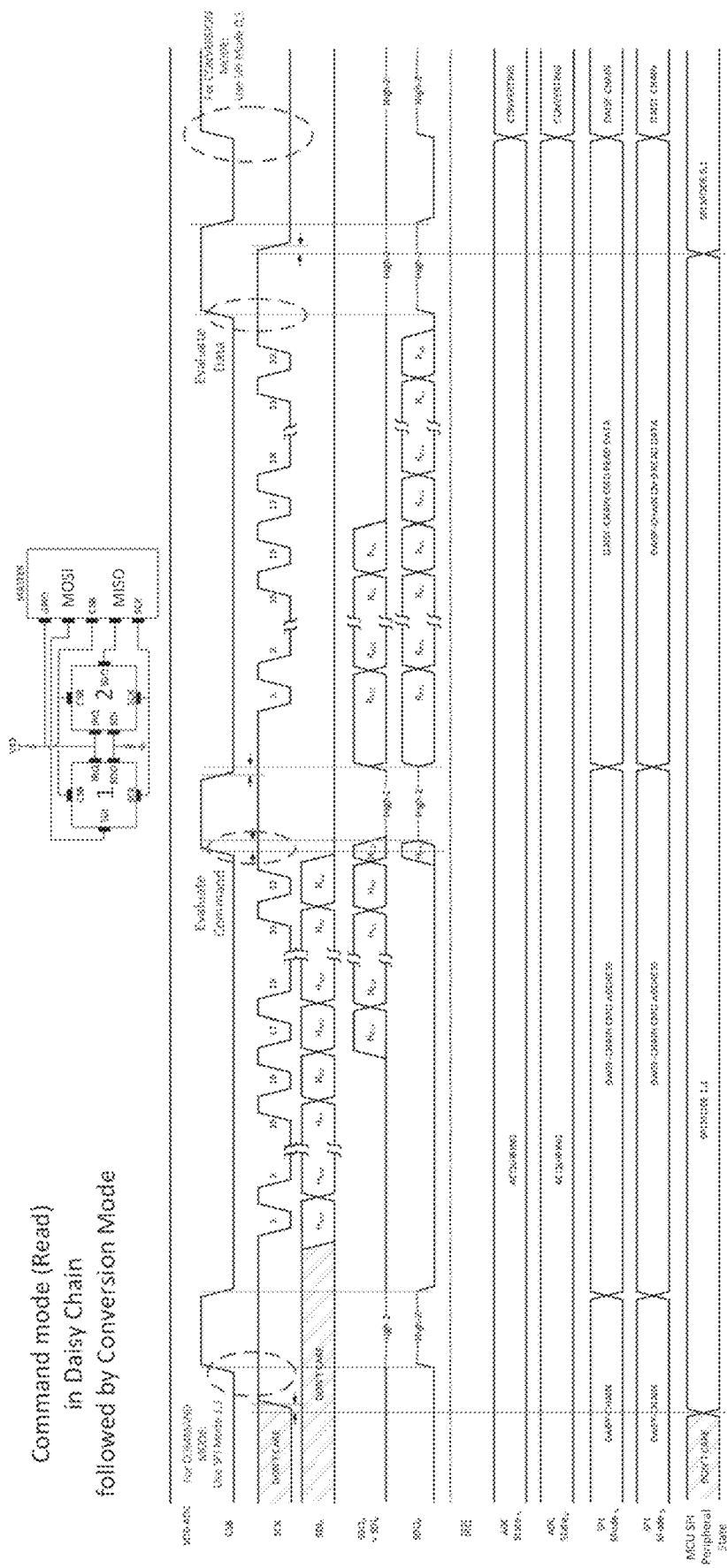

FIG. 8 shows a timing diagram for a configuration of daisy-chained slave devices and how the devices can be configured individually. When in DAISY-CHAIN mode, each slave device only evaluates a received command if the master de-asserts the chip select signal while the slave device remains in command mode. FIG. 8 shows that depending on the length of the transmission, the data may be routed to other slave devices in the daisy chain. All slave devices only evaluate the command they receive when they detect the de-assertion of the chip select signal by the master. Thus, if for example, only the second slave device in the daisy chain needs to be accessed, the first slave device may receive a no operation command (NOP) and therefore a total of two command words are transferred out by the master through the daisy chain. Upon de-assertion of the chip select signal by the master, only the second slave device may perform a function because the first slave device has a no operation command (NOP). FIG. 8 shows a specific example where the command sent to each slave device is a READ instruction, i.e. there is no NOP command: therefore, after the second assertion of the chip select signal, each slave device will output read data on their respective SDO line. Data is collected by the master device in reverse order, starting from the last element of the chain. At the end of the timing diagram in FIG. 8, the master switches all devices back into conversion mode by switching its SPI bus into SPI mode (0, 1).

Figure 9:
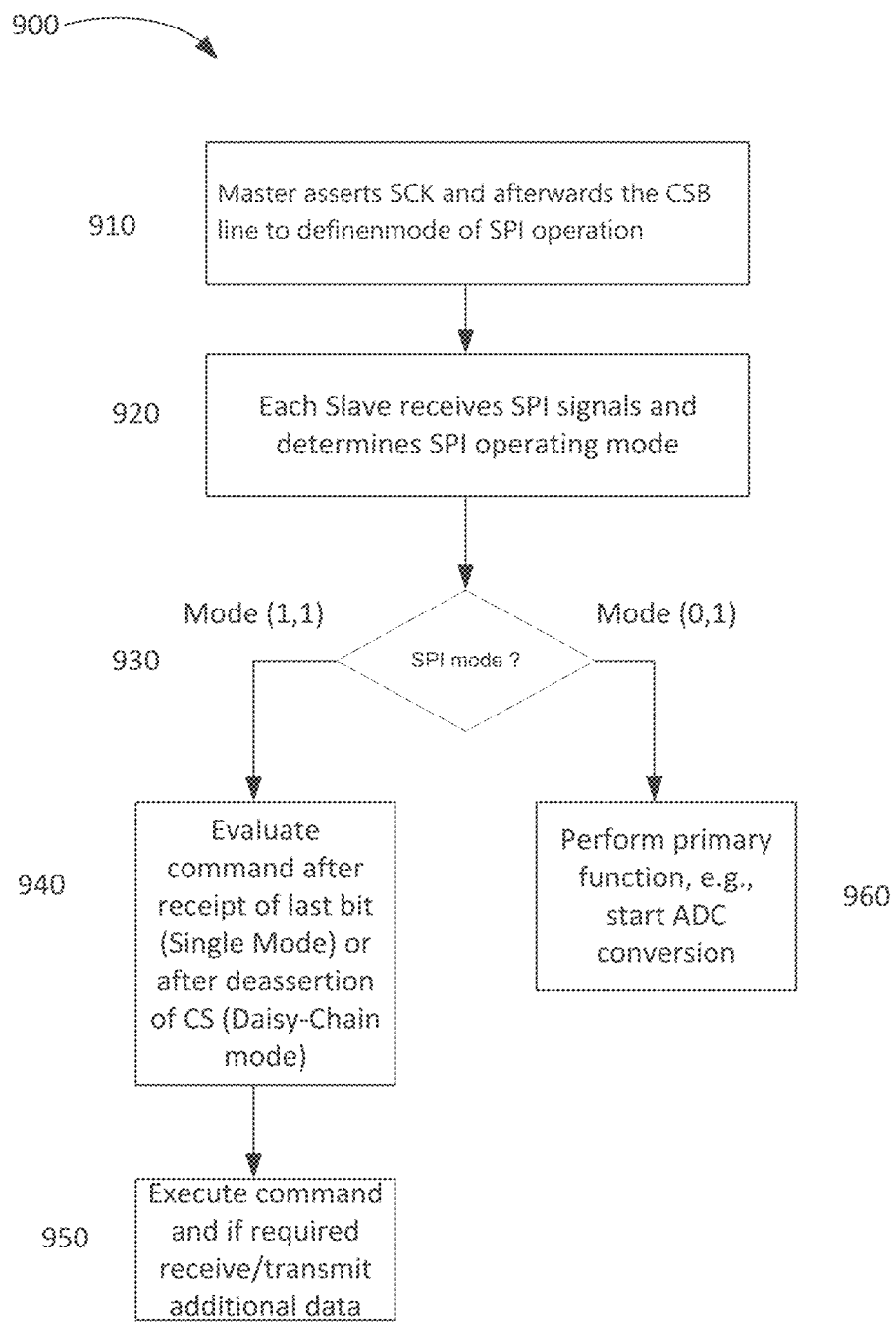
FIG. 9 shows a flowchart according to various embodiments of the methods described herein.

FIG. 9 shows a flowchart 900 according to various aspects of the methods for operating a slave device or a system with a master device and one or more slave devices in Single (i.e. where is no daisy-chain and only one slave device is connected with an SPI Master) or Daisy-Chain mode. In Single mode, in step 910 master device asserts the SCK and afterwards the CSB signal of the SPI module to define a mode of SPI operation. In step 920, the peripheral slave device detects an SPI operating mode that has been applied by the master device. In step 930, the peripheral slave device configures itself to operate in the SPI mode (0,1) or mode (1,1) depending on the detection of the SPI operating mode as applied by the master device. When operating in the first mode, in step 940 the peripheral slave device evaluates a received command as soon as the last bit has been received. The command is executed in step 950 and if required by the command additional data is received or transferred by the slave device. In case the second mode has been detected, the peripheral slave device will perform its primary function 960. For example, an ADC will start a single conversion or continuous conversion depending on its configuration. Other peripheral slave device may perform other primary functions, such as, a modulator may be controlled to start or stop modulation with each receipt of a second mode SPI operation by the master deice. Any primary function may be controlled by the second mode. Additional data may be transferred in second mode, for example, to perform conversion of a DAC. The present application is not restricted to ADCs.

FIG. 9 also supports the Daisy-Chain mode. As indicated in step 940, when in Daisy-Chain mode, each slave device will not evaluate a received command when the last bit has been received. Rather, the CS line is de-asserted by the master to indicate to the slave devices that the transferred command is to be evaluated.

Thus, according to various embodiments, the slave devices can be designed to operate in Single mode using the topology shown in FIG. 2a or in Daisy-Chain mode using the topology of FIG. 2b. These two modes are designed to act on commands in different ways. In Single mode, commands are evaluated as soon as the last bit of the command is received, whereas in Daisy-Chain mode, commands are evaluated at the rising edge of CS. This allows to send as much data as needed through the chain, without any need for indexing the devices. According to one embodiment, the switch between Single mode and Daisy-Chain mode is initiated via a Fast command as discussed above to provide the highest possible compatibility with existing microcontrollers. However, as mentioned before, this additional mode may also be initiated using the MOSI line if a microcontroller allows such implementations. In one embodiment, both options may be implemented within a slave device to provide full flexibility. Thus, according to such an embodiment, the Daisy-Chain mode may be either entered through a command or an enhanced evaluation of the SPI operating mode.

The various embodiments shown can be used by any slave device that needs to communicate more than one type of data with a master device (e.g. microcontroller, FPGA, without limitation), using the same SPI hardware bus or operate in at least two different modes. The various embodiments are not limited to analog-to-digital converters but could be applied for example to sensors (e.g. temperature, camera, without limitation), power monitors, ADCs, memory (e.g. flash, EEPROM), PHY chips including USB, Bluetooth, without limitation.

The invention claimed is:

1. A slave device comprising a serial peripheral interface (SPI) module, further comprising a mode detection circuit configured to detect an SPI operating mode that has been applied by a master device, wherein the slave device is configurable to operate in a first or a second mode depending on the detection of the SPI operating mode as applied by the master device, wherein the mode detection circuit comprises an edge and signal detection circuit receiving a chip select signal and a clock signal from the master device.

2. The slave device according to claim 1, wherein the edge and signal detection circuit evaluates the state of the clock signal when the chip select signal transitions from an asserted state to an idle state.

3. The slave device according to claim 1, wherein a first mode is a functional mode and wherein receiving signals from the master device indicating the first mode control a primary function of the slave device.

4. A slave device comprising a serial peripheral interface (SPI) module, further comprising a mode detection circuit configured to detect an SPI operating mode that has been applied by a master device, wherein the slave device is configurable to operate in a first or a second mode depending on the detection of the SPI operating mode as applied by the master device, wherein the slave device is an analog-to-digital converter and the first mode is a conversion mode.

5. The slave device according to claim 4, wherein selecting a first SPI operating mode by the master device triggers a start of at least one conversion of the analog-to-digital converter.

6. A slave device comprising a serial peripheral interface (SPI) module, further comprising a mode detection circuit configured to detect an SPI operating mode that has been applied by a master device, wherein the slave device is configurable to operate in a first or a second mode depending on the detection of the SPI operating mode as applied by the master device, wherein a second mode is a command mode that allows configuration of the slave device and access to registers of the slave device.

7. The slave device according to claim 6, wherein after identifying the second mode by the slave device, the slave device is configured to expect a command on a data in signal line.

8. The slave device according to claim 6, wherein the slave device is further configurable to operate in a Single mode or a Daisy-Chain mode, wherein a mode switch is performed through a dedicated command.

9. The slave device according to claim 8, wherein a received command is evaluated by the slave device as soon as a last bit of the command is received when in Single mode and wherein in Daisy-Chain mode a received command is evaluated by the slave device only after de-assertion of a chip select signal.

10. A slave device comprising a serial peripheral interface (SPI) module, further comprising a mode detection circuit configured to detect an SPI operating mode that has been applied by a master device, wherein the slave device is configurable to operate in a first or a second mode depending on the detection of the SPI operating mode as applied by the master device, wherein the slave device is further configurable to operate in a third mode through a logic state on a data output line of the master device, wherein the third mode is a command mode in a Daisy-Chain mode.

11. A system comprising a master device and a plurality of slave devices coupled in daisy-chain topology with a serial peripheral interface (SPI) module of the master device, wherein each slave device comprises an SPI module and further comprises a mode detection circuit configured to detect an SPI operating mode that has been applied by the master device, wherein each slave device is configurable to operate in a first or a second mode depending on the detection of the SPI operating mode as applied by the master device through a clock signal and a chip select signal.

12. The system according to claim 11, wherein a first mode is a functional mode wherein a primary function of the slave device is performed and wherein a second mode is a command mode that allows configuration of the slave device and access to registers of the slave device.

13. The system according to claim 12, wherein a dedicated command received by a slave device in command mode causes the device to enter a Daisy-Chain mode.

14. The system according to claim 12, wherein when in Daisy-Chain mode, each slave device only evaluates a received command if the master de-asserts the chip select signal while remaining in command mode.

15. A method of operating a slave device coupled with a master device through a serial peripheral interface (SPI) module, the method comprising:
detecting an SPI operating mode by the slave device that has been applied by a master device, wherein the slave device is configurable to operate in a first or a second mode, by
receiving and analyzing a chip select signal and a clock signal from the master device to determine whether said first or second mode has been applied; and
operating the slave device in the first or second mode depending on the detection of the SPI operating mode as applied by the master device.

16. The method according to claim 15, wherein the state of the clock signal is evaluated when the chip select signal transitions from an asserted state to an idle state.

17. A method of operating a slave device coupled with a master device through a serial peripheral interface (SPI) module, the method comprising:
detecting and SPI operating mode by the slave device that has been applied by a master device, wherein the slave device is configurable to operate in a first or a second mode, and
operating the slave device in the first or second mode depending on the detection of the SPI operating mode as applied by the master device, wherein a first mode is a functional mode wherein a primary function of the slave device is performed and wherein a second mode is a command mode that allows configuration of the slave device and access to registers of the slave device.

18. The method according to claim 17, further comprising:
configuring the slave device to operate in a Single mode or a Daisy-Chain mode, wherein a mode switch is performed through a dedicated command received during a command mode.

19. A method for operating a system comprising a master device and a plurality of slave devices coupled in daisy-chain topology with a serial peripheral interface (SPI) module of the master device, wherein each slave device comprises an SPI module and further comprises a mode detection circuit configured to detect an SPI operating mode that has been applied by the master device, the method comprising:
sending signals through the SPI module by the master device that indicate a selected SPI operating mode; and
receiving in Daisy-Chain fashion by each slave device said signals and determining by each slave device to operate in a first or a second mode depending on the detection of the SPI operating mode as applied by the master device.

20. The method according to claim 19, wherein a dedicated command received by a slave device in command mode causes the device to enter a Daisy-Chain mode.

21. The method according to claim 19, wherein when in Daisy-Chain mode, each slave device only evaluates a received command if the master de-asserts a chip select signal while remaining in command mode.

* * * * *